US012174517B2

(12) United States Patent
Mori et al.

(10) Patent No.: US 12,174,517 B2
(45) Date of Patent: Dec. 24, 2024

(54) IMAGING DEVICE FOR VEHICLE

(71) Applicant: KABUSHIKI KAISHA TOKAI-RIKA-DENKI-SEISAKUSHO, Aichi (JP)

(72) Inventors: Kazuya Mori, Aichi (JP); Tomonori Ichikawa, Aichi (JP); Masakazu Iwatsuki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 63 days.

(21) Appl. No.: 17/921,265

(22) PCT Filed: Apr. 23, 2021

(86) PCT No.: PCT/JP2021/016439
§ 371 (c)(1),
(2) Date: Oct. 25, 2022

(87) PCT Pub. No.: WO2021/220959
PCT Pub. Date: Nov. 4, 2021

(65) Prior Publication Data
US 2023/0185171 A1 Jun. 15, 2023

(30) Foreign Application Priority Data
Apr. 30, 2020 (JP) ................................ 2020-080796

(51) Int. Cl.
G03B 17/55 (2021.01)
G03B 17/02 (2021.01)

(52) U.S. Cl.
CPC ............. G03B 17/55 (2013.01); G03B 17/02 (2013.01)

(58) Field of Classification Search
CPC ..... H04N 5/2252; H04N 5/2254; G03B 17/55
(Continued)

(56) References Cited

U.S. PATENT DOCUMENTS 10,887,496 B2   1/2021  Ichimura et al.
10,912,152 B2   2/2021  Shinkai
(Continued)

FOREIGN PATENT DOCUMENTS

EP   3349063      7/2018
JP   H06258713    9/1994
(Continued)

OTHER PUBLICATIONS

PCT International Search Report (w/ English translation) and Written Opinion for corresponding PCT Application No. PCT/JP2021/016439, mailed on Jul. 6, 2021—11 pages.

Primary Examiner — Joel W Fosselman
(74) Attorney, Agent, or Firm — Dority & Manning, P.A.

(57) ABSTRACT

In this vehicular imaging device, a positive electrode terminal for a heater and a negative electrode terminal for the heater, which are different from a heater film of a cover glass, are integrally formed with a bracket body of a bracket by insert molding. When the cover glass is disposed in the bracket body, a positive electrode side press-contact part of the positive electrode terminal for the heater and a negative electrode side press-contact part of the negative electrode terminal for the heater are brought into press contact with the heater film of the cover glass. Thus, the positive electrode terminal for the heater, the negative electrode terminal for the heater, and the heater film are electrically connected together.

19 Claims, 4 Drawing Sheets

(58) Field of Classification Search
USPC .......................................................... 348/374
See application file for complete search history.

(56) References Cited

U.S. PATENT DOCUMENTS

| | | | |
|---|---|---|---|
| 11,034,332 | B2 | 6/2021 | Mueller et al. |
| 2006/0171704 | A1 | 8/2006 | Bingle |
| 2011/0073142 | A1 | 3/2011 | Hattori et al. |
| 2019/0318972 | A1* | 10/2019 | Nagai .................... H05K 1/185 |

FOREIGN PATENT DOCUMENTS

| | | |
|---|---|---|
| JP | 2003-267140 | 9/2003 |
| JP | 2018-116121 | 7/2018 |
| JP | 2018-116122 | 7/2018 |
| JP | 2019-077311 | 5/2019 |
| JP | 2020-030908 | 2/2020 |

* cited by examiner

IMAGING DEVICE FOR VEHICLE

CROSS-REFERENCE TO RELATED APPLICATIONS

The present application is related and has right of priority to JP 2020-080796, which was filed on Apr. 30, 2020 in the Japanese Patent Office, and is a U.S. national phase entry of PCT/JP2021/016439, which was filed on Apr. 23, 2021, both of which are incorporated by reference in their entireties for all purposes.

TECHNICAL FIELD

The present disclosure relates to an imaging device for a vehicle.

BACKGROUND ART

The imaging device for a vehicle disclosed in Japanese Patent Application Laid-Open (JP-A) No. 2018-116121 for example has a heat-generating body. A glass cover is heated by the heat generated at the heat-generating portion of the heat-generating body, and due thereto, water droplets and the like that have adhered to the glass cover are removed. The heat-generating body has a connecting portion connected to the heat-generating portion, and a base portion connected to the connecting portion. A terminal for connection with a connector is provided at the base portion. It is preferable that the assembly work at such an imaging device for a vehicle be simple.

SUMMARY OF INVENTION

Technical Problem

In view of the above-described circumstances, an object of the present disclosure is to provide an imaging device for a vehicle at which the assembly work is simple.

Solution to Problem

An imaging device for a vehicle of a first aspect of the present disclosure comprises: an imaging section that can capture images of an imaging side; a heater that, by being energized, generates heat and removes moisture that has adhered to the imaging section; a bracket to which the imaging section and the heater are assembled; and a terminal that can energize the heater, and that is provided at the bracket and structured as a body separate from the heater, and that is electrically connected to the heater due to the heater being assembled to the bracket.

In the imaging device for a vehicle of the first aspect of the present disclosure, the terminal that is structured by a body separate from the heater is provided at the bracket, the terminal and the heater are electrically connected due to the heater being assembled to the bracket, and the heater can be energized. In this way, the workability can be improved because there is no need for special work for electrically connecting the terminal and the heater.

In an imaging device for a vehicle of a second aspect of the present disclosure, in the imaging device for a vehicle of the above-described first aspect, the imaging section is structured to include a cover member that is provided at an imaging side of an imaging section main body, and at which at least a range of an angle of view of an image captured by the imaging section main body is transparent, and the heater removes moisture that has adhered to the cover member by generating heat.

In the imaging device for a vehicle of the second aspect of the present disclosure, when the heater is made to generate heat, the moisture adhering to the cover member, which, together with the imaging section main body, structures the imaging section, is removed. Because the cover member is provided at the imaging side of the imaging section main body, due to the moisture that has adhered to the cover member being removed, the quality of the image captured by the imaging section main body deteriorating due to moisture that has adhered to the cover member can be suppressed.

In an imaging device for a vehicle of a third aspect of the present disclosure, in the imaging device for a vehicle of the above-described first aspect or second aspect, the heater is a film that is transparent, is electrically conductive, and is formed at a portion at an imaging side of the imaging section.

In accordance with the imaging device for a vehicle of the third aspect of the present disclosure, the heater is a film that is formed at a portion, which is at the imaging side, of the imaging section. Because this film is transparent, the heater can be provided in the range of the angle of view of the image captured by the imaging section main body.

In an imaging device for a vehicle of a fourth aspect of the present disclosure, in the imaging device for a vehicle of any one of the above-described first aspect through third aspect, the terminal is made to press-contact the heater and is electrically connected to the heater due to the heater being assembled to the bracket.

In the imaging device for a vehicle of the fourth aspect of the present disclosure, when the heater is assembled to the bracket, the terminal is made to press-contact the heater, and the terminal and the heater are electrically connected. Therefore, inadvertent cancelling of the contact between the terminal and the heater can be suppressed.

In an imaging device for a vehicle of a fifth aspect of the present disclosure, in the imaging device for a vehicle of any one of the above-described first aspect through fourth aspect, the terminal is provided integrally with the bracket.

In the imaging device for a vehicle of the fifth aspect of the present disclosure, because the terminal is provided integrally with the bracket, the terminal and the heater can be made to contact one another and can be electrically connected due to the heater being assembled to the bracket at a predetermined assembly position of the bracket.

In an imaging device for a vehicle of a sixth aspect of the present disclosure, in the imaging device for a vehicle of the above-described fifth aspect, at a time of molding the bracket, the terminal is provided at the bracket by insert molding.

In accordance with the imaging device for a vehicle of the sixth aspect of the present disclosure, because the terminal is provided at the bracket by insert molding, work of assembling the terminal to the bracket is unnecessary.

In an imaging device for a vehicle of a seventh aspect of the present disclosure, the imaging device for a vehicle of any one of the above-described first aspect through sixth aspect comprises an urging portion that urges the heater toward the terminal side.

In accordance with the imaging device for a vehicle of the seventh aspect of the present disclosure, the heater is urged toward the terminal side by the urging portion. Due thereto, the heater can be made to press-contact the terminal, and moreover, cancelling of the press-contacting of the heater with the terminal can be suppressed.

In an imaging device for a vehicle of an eighth aspect of the present disclosure, in the imaging device for a vehicle of any one of the above-described first aspect through seventh aspect, the terminal can urge the heater toward a side opposite the terminal by elastic force.

In accordance with the imaging device for a vehicle of the eighth aspect of the present disclosure, the heater is urged toward the side opposite the terminal by the elastic force of the terminal. Due thereto, the terminal can be made to press-contact the heater, and moreover, cancelling of the press-contacting of the terminal with the heater can be suppressed.

In an imaging device for a vehicle of a ninth aspect of the present disclosure, in the imaging device for a vehicle of any one of the above-described first aspect through eighth aspect, the terminal has: a positive electrode terminal that electrically connects the heater to a battery installed in a vehicle, and a negative electrode terminal that electrically connects the heater to earth, wherein a portion, which is at the heater side, of at least one of the positive electrode terminal and the negative electrode terminal is divided into plural portions, and the respective portions are made to contact the heater.

In accordance with the imaging device for a vehicle of the ninth aspect of the present disclosure, a portion, which is at the heater side, of at least one of the positive electrode terminal and the negative electrode terminal is divided into plural portions, and each of these portions at the heater side is made to contact the heater. Due thereto, the contact pressure which the heater receives from the heater-side portion of at least one of the positive electrode terminal and the negative electrode terminal can be dispersed.

Advantageous Effects of Invention

As described above, at the imaging device for a vehicle relating to the present disclosure, the assembly work can be made to be simple.

DESCRIPTION OF EMBODIMENTS

Respective embodiments of the present disclosure are described next on the basis of the respective drawings of FIG. 1 through FIG. 4. Note that arrow FR that is shown appropriately in the respective drawings indicates the device front side of an imaging device 10 for a vehicle, arrow LH indicates the device left side, and arrow UP indicates the device upper side. Note that these device front side, device left side and device upper side are not necessarily related to the longitudinal direction, the left-right direction and the vertical direction of the vehicle in which the present imaging device 10 for a vehicle is installed.

Structure of First Embodiment

Figure 1:
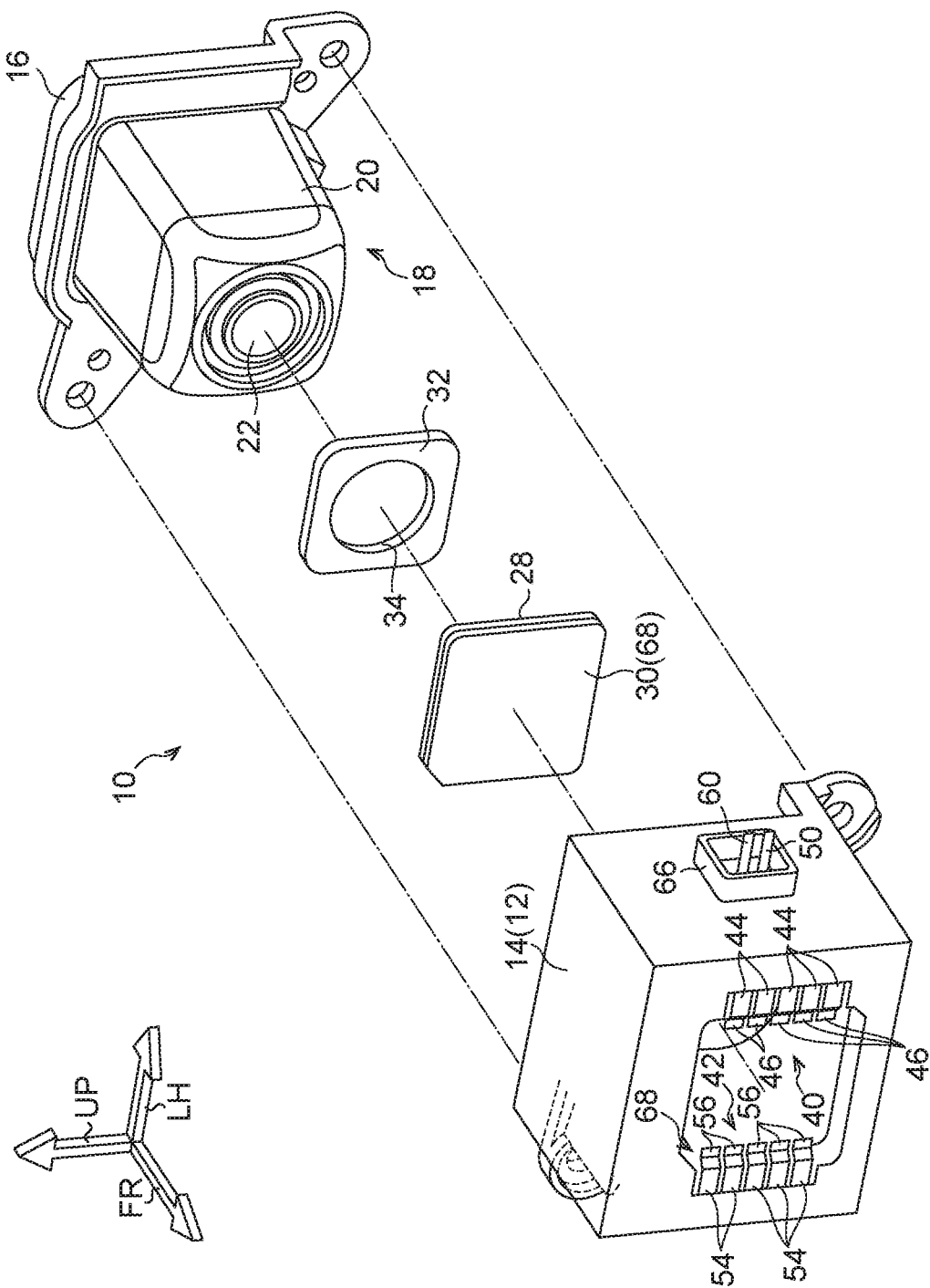
FIG. 1 is an exploded perspective view of an imaging device for a vehicle relating to a first embodiment.
Figure 3:
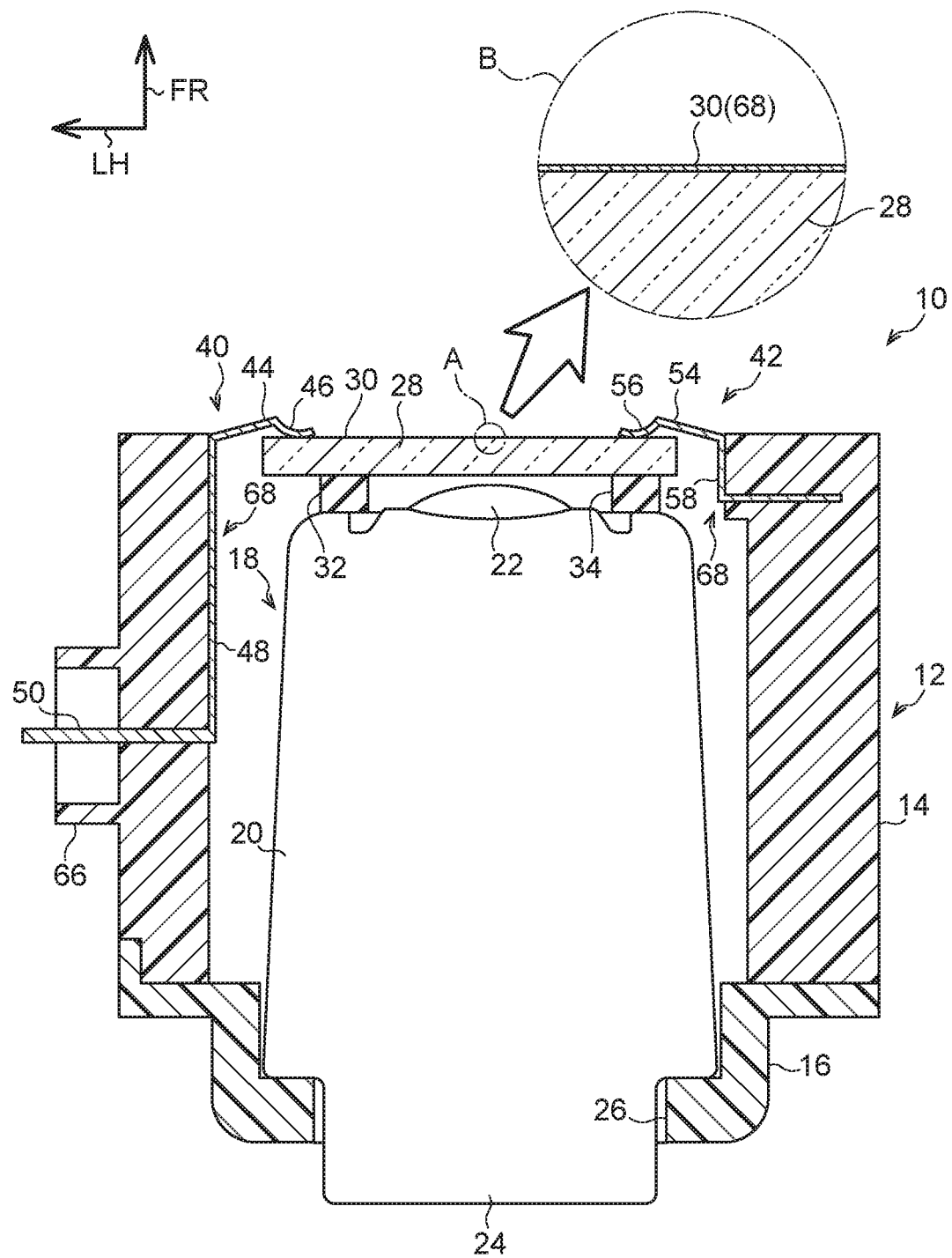
FIG. 3 is a cross-sectional view cut along line 3-3 of FIG. 2.

As illustrated in FIG. 1, the imaging device 10 for a vehicle relating to the first embodiment has a bracket 12. As illustrated in FIG. 3, the bracket 12 is structured to include a bracket main body 14 and a closing member 16. Further, the bracket main body 14 and the closing member 16 respectively are formed from, for example, a synthetic resin material that is insulating.

The bracket main body 14 is tubular for example, and the both ends thereof at the device longitudinal direction (the arrow FR direction in FIG. 3 and the like and the direction opposite thereto) sides are open. Further, the cross-sectional shapes of the outer peripheral shape and the inner peripheral shape when the bracket main body 14 is cut along a direction orthogonal to the device longitudinal direction are rectangular for example. The closing member 16 is provided at the device rear side of the bracket main body 14, and is assembled to the device rear side end portion of the bracket main body 14.

The bracket 12 is, for example, assembled to a housing (not illustrated) at the inner side of the housing. The housing is provided, for example, at the vehicle outer side of the vehicle front side end portion of a door panel corresponding to a front seat of the vehicle (none of which are illustrated). Further, the housing is mounted to the body of the vehicle via a connecting bracket (not illustrated). The connecting bracket can pivot, with respect to the body of the vehicle, between a retracted state and a usable state.

A camera 18, which serves as an imaging section main body and structures an imaging section, is disposed at the inner side of the bracket 12. The camera 18 has a camera main body 20 and a lens 22. The lens 22 is provided at the device front side at the camera main body 20, and the camera 18 can capture images of the device front side of the camera 18. Namely, in the present embodiment, the device front side (the arrow FR direction side in FIG. 3 and the like) is the "imaging direction".

The device rear side portion of the camera main body 20 is a camera side connector 24. A hole 26 is formed in the closing member 16 of the bracket 12 in correspondence with the camera side connector 24. The hole 26 passes through the closing member 16 in the device longitudinal direction, and the camera side connector 24 is disposed so as to pass through the inner side of the hole 26. Due thereto, the device rear side end portion of the camera side connector 24 projects out to the device rear side of the closing member 16 (i.e., the device rear side of the bracket 12).

A first connector (not illustrated) is mechanically connected to the camera side connector 24, and, due thereto, a terminal at the camera side connector 24 side and a terminal at the first connector side are connected mechanically and electrically. The terminal at the first connector side is electrically connected to the battery, a control device and the like that are installed in the vehicle. The camera main body 20 can be energized via the terminal at the camera side connector 24 side and the terminal at the first connector side. Imaging by the camera 18 becomes possible due to the camera main body 20 being energized.

Further, the camera 18 is connected directly or indirectly via the control device or the like to a monitor (not illustrated) that serves as a display portion. The monitor is mounted to the instrument panel of the vehicle for example. The vehicle occupant who is seated in the driver's seat or the like of the vehicle can see the images captured by the camera 18 by viewing the monitor.

On the other hand, a glass cover 28, which serves as a cover member and which, together with the camera 18, structures the imaging section, is provided at the device front side of the camera 18. The glass cover 28 is shaped as a flat plate that is transparent, and the thickness direction of the glass cover 28 is approximately the device longitudinal direction. As illustrated by the portion in the one-dot chain line circle B that schematically illustrates the portion of the one-dot chain line circle A in an enlarged manner in FIG. 3, a heater coating film 30 that structures a heater and serves as a film is formed at the device front side surface of the glass cover 28.

The heater coating film 30 is formed by, for example, indium tin oxide, or so-called "ITO", that is a compound in which tin is added to indium oxide. The heater coating film 30 is basically colorless and transparent, and is formed by vapor deposition on the device front side surface of the glass cover 28. Note that the method of forming the heater coating film 30 on the glass cover 28 may be another method such as electron beam deposition, physical vapor deposition, spattering deposition, or the like, and the method of forming the heater coating film 30 onto the glass cover 28 is not particularly limited.

A tape 32 serving as an urging member is provided between the camera 18 and the glass cover 28. The tape 32 is plate-shaped, and the thickness direction of the tape 32 is approximately the device longitudinal direction. The device rear side surface of the tape 32 abuts the device front side end of the camera main body 20 of the camera 18, and the device rear side surface of the tape 32 abuts the device rear side surface of the glass cover 28. A hole portion 34 is formed in the tape 32. The hole portion 34 passes-through in the thickness direction of the tape 32. The edge of the hole portion 34 is positioned, for example, at the outer side of the angle of view that is the range in which the image captured by the camera 18 is projected onto the above-described monitor.

Further, the tape 32 is elastic in at least the thickness direction. Therefore, when the glass cover 28 receives load from the device front side, the tape 32 urges the glass cover 28 toward the device front side, due to the elastic reaction force that is based on the load received from the glass cover 28. Moreover, the tape 32 is a so-called "double-sided tape", and an adhesive is coated on the surfaces at the thickness direction both sides of the tape 32. Therefore, the glass cover 28 is fixed by the tape 32 to the device front side end of the camera main body 20 of the camera 18.

Note that, in the present embodiment, the tape 32 is a structure that fixes the glass cover 28 to the device front side end of the camera main body 20. However, it suffices for the urging member to be able to urge the glass cover 28 toward the device front side. Accordingly, a fixing portion, which fixes the glass cover 28 to the device front side end of the camera main body 20, or the like may be provided separately from the urging member.

On the other hand, a positive electrode terminal 40 for the heater, which structures the terminal and serves as the positive electrode terminal, and a negative electrode terminal 42 for the heater, which structures the terminal and serves as the negative electrode terminal, are provided at the bracket main body 14. These positive electrode terminal 40 for the heater and negative electrode terminal 42 for the heater are formed of, for example, thin-walled plate members that are electrically conductive overall, such as metal or the like. Further, each of the positive electrode terminal 40 for the heater and the negative electrode terminal 42 for the heater can bendingly deform elastically with the center of the curvature being a thickness direction side of the plate member that forms the positive electrode terminal 40 for the heater or the negative electrode terminal 42 for the heater.

The positive electrode terminal 40 for the heater has plural (five in the present embodiment) positive electrode side press-contact pieces 44. Each of the positive electrode side press-contact pieces 44 is basically formed in the shape of a narrow-width plate. As illustrated in FIG. 3, the direction from the longitudinal direction proximal end toward the longitudinal direction distal end of the positive electrode side press-contact piece 44 is an obliquely front right side of the device (a direction that is inclined toward the arrow FR direction side with respect to the direction at the side opposite the arrow LH direction in FIG. 3 and the like). These positive electrode side press-contact pieces 44 are disposed between the device upper side end and the device lower side end of the opening that is at the device front side of the bracket main body 14 of the bracket 12. These positive electrode side press-contact pieces 44 are lined-up at a predetermined interval in the device vertical direction (the arrow UP direction in FIG. 2 and the direction opposite thereto).

Figure 2:
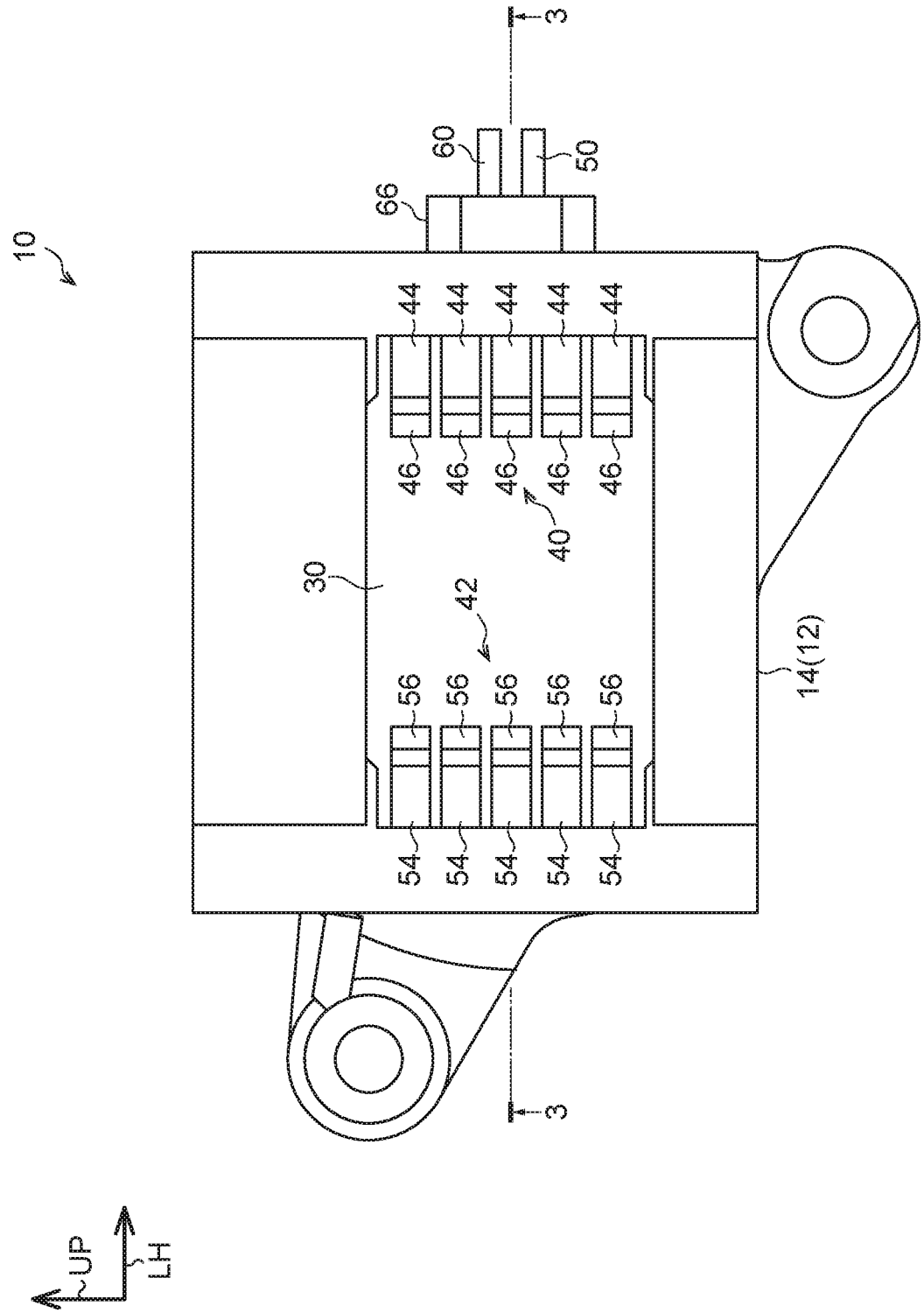
FIG. 2 is a front view seen from the device front side of the imaging device for a vehicle relating to the first embodiment.

As illustrated in FIG. 2, a positive electrode side press-contact portion 46 is formed at the longitudinal direction distal end side of each of the positive electrode side press-contact pieces 44. As illustrated in FIG. 3, the positive electrode side press-contact portion 46 basically bends so as to bulge out toward the device rear side, and faces the glass cover 28 at the device front side of the device left side portion of the device front side surface of the above-described glass cover 28. In the assembled state of the present imaging device 10 for a vehicle, the positive electrode side press-contact portions 46 press-contact the heater coating film 30 that is formed on the device front side surface of the glass cover 28, due to the elastic forces of the positive electrode side press-contact pieces 44. Due thereto, the positive electrode side press-contact pieces 44 are electrically connected to the heater coating film 30.

Further, the positive electrode terminal 40 for the heater has a positive electrode side intermediate portion 48. One end side portion of the positive electrode side intermediate portion 48 is provided along the device left side portion at the inner side of the bracket main body 14 of the bracket 12, and one end of the positive electrode side intermediate portion 48 is connected to the longitudinal direction proximal ends of all of the positive electrode side press-contact pieces 44. The another end side of the positive electrode side intermediate portion 48 is entered into the inner side of the resin portion that forms the device left side portion of the bracket main body 14.

Moreover, as illustrated in FIG. 1 through FIG. 3, the positive electrode terminal 40 for the heater has a positive electrode side connector terminal portion 50. The longitudinal direction of the positive electrode side connector terminal portion 50 is approximately the device left-right direction (the arrow LH direction in FIG. 1 and FIG. 3 and the direction opposite thereto). The positive electrode side connector terminal portion 50 is disposed at the device left side of the bracket main body 14 of the bracket 12 (the outer side of the bracket main body 14). The longitudinal direction proximal end of the positive electrode side connector terminal portion 50 is connected to the another end of the above-described positive electrode side intermediate portion 48.

In contrast, the negative electrode terminal 42 for the heater has plural (five in the present embodiment) negative electrode side press-contact pieces 54. Each of the negative electrode side press-contact pieces 54 is basically formed in the shape of a narrow-width plate. As illustrated in FIG. 3, the direction from the longitudinal direction proximal end toward the longitudinal direction distal end of the negative electrode side press-contact piece 54 is an obliquely front left side of the device (a direction that is inclined toward the arrow FR direction side with respect to the arrow LH direction in FIG. 3 and the like). These negative electrode side press-contact pieces 54 are disposed between the device upper side end and the device lower side end of the opening that is at the device front side of the bracket main body 14 of the bracket 12. These negative electrode side press-contact pieces 54 are lined-up at a predetermined interval in the device vertical direction (the arrow UP direction in FIG. 2 and the direction opposite thereto).

As illustrated in FIG. 2, a negative electrode side press-contact portion 56 is formed at the longitudinal direction distal end side of each of the negative electrode side press-contact pieces 54. As illustrated in FIG. 3, the negative electrode side press-contact portion 56 basically bends so as to bulge out toward the device rear side, and faces the glass cover 28 at the device front side of the device right side portion of the device front side surface of the above-described glass cover 28. In the assembled state of the present imaging device 10 for a vehicle, the negative electrode side press-contact portions 56 press-contact the heater coating film 30 that is formed on the device front side surface of the glass cover 28, due to the elastic forces of the negative electrode side press-contact pieces 54. Due thereto, the negative electrode side press-contact pieces 54 are electrically connected to the heater coating film 30.

Further, the negative electrode terminal 42 for the heater has a negative electrode side intermediate portion 58. One end side portion of the negative electrode side intermediate portion 58 is provided along the device right side portion at the inner side of the bracket main body 14 of the bracket 12, and one end of the negative electrode side intermediate portion 58 is connected to the longitudinal direction proximal ends of all of the negative electrode side press-contact pieces 54. The another end side of the negative electrode side intermediate portion 58 is entered into the inner side of the resin portion that forms the bracket main body 14, from the device right side portion of the bracket main body 14 of the bracket 12. Moreover, although detailed illustration thereof is omitted, the another end side of the negative electrode side intermediate portion 58 extends to the device left side portion of the bracket main body 14, at the inner side of the resin portion that forms the bracket main body 14.

Moreover, as illustrated in FIG. 1, the negative electrode terminal 42 for the heater has a negative electrode side connector terminal portion 60. The longitudinal direction of the negative electrode side connector terminal portion 60 is approximately the device left-right direction (the arrow LH direction in FIG. 1 and FIG. 3 and the direction opposite thereto). The negative electrode side connector terminal portion 60 is disposed at the device left side of the bracket main body 14 of the bracket 12 (the outer side of the bracket main body 14). The longitudinal direction proximal end of the negative electrode side connector terminal portion 60 is connected to the another end of the above-described negative electrode side intermediate portion 58.

As described above, the bracket main body 14 is formed of a synthetic resin material. In the state in which the positive electrode terminal 40 for the heater and the negative electrode terminal 42 for the heater are disposed at the inner side of a mold for molding the bracket main body 14 at the time when the bracket main body 14 is molded, the synthetic resin material is filled into the mold. The bracket main body 14, at which the positive electrode terminal 40 for the heater and the negative electrode terminal 42 for the heater are provided, is formed by such so-called "insert molding".

On the other hand, a connector portion 66 is provided at the bracket main body 14. The connector portion 66 is formed in the shape of a substantially rectangular frame. The connector portion 66 is formed integrally with the device left side portion of the bracket main body 14 at the outer side of the device left side portion of the bracket main body 14, and the connector portion 66 opens toward the device left side. The above-described positive electrode side connector terminal portion 50 of the positive electrode terminal 40 for the heater and negative electrode side connector terminal portion 60 of the negative electrode terminal 42 for the heater are surrounded by the connector portion 66.

A second connector (not illustrated) is mechanically connected to the connector portion 66. Due thereto, the positive electrode side connector terminal portion 50 and the negative electrode side connector terminal portion 60, and terminals at the second connector side, are mechanically and electrically connected. Among the terminals at the second connector side, the terminal that is connected to the positive electrode side connector terminal portion 50 is electrically connected to the battery, the control device and the like that are installed in the vehicle. The heater coating film 30 that is formed at the glass cover 28 can be energized via the positive electrode side connector terminal portion 50 and the terminal at the second connector side. In contrast, among the terminals at the second connector side, the terminal that is connected to the negative electrode side connector terminal portion 60 is earthed (grounded) directly or indirectly.

Namely, the terminal of the second connector, which is connected to the positive electrode side connector terminal portion 50 of the positive electrode terminal 40 for the heater, and the positive electrode terminal 40 for the heater, the heater coating film 30 formed on the glass cover 28, the negative electrode terminal 42 for the heater, and the terminal of the second connector that is connected to the negative electrode side connector terminal portion 60 of the negative electrode terminal 42 for the heater structure an electrical circuit 68 for the heater that is for energizing the heater coating film 30. The heater coating film 30 is energized due to the electrical circuit 68 for the heater being energized, and the heater coating film 30 is made to generate heat by being energized.

Operation, Effects of First Embodiment

In the present embodiment that has the above-described structure, the bracket 12 is provided at the inner side of the housing. Therefore, when the humidity within the housing becomes high, water droplets adhere to the glass cover 28, and the glass cover 28 fogs up. Further, there are cases in which frost adheres to the glass cover 28 when the external air temperature of the vehicle is low. In such cases, when the heater switch (not illustrated) within the vehicle cabin is operated, the electrical circuit 68 for the heater is energized by the control device. Due to the electrical circuit 68 for the heater being energized in this way, the heater coating film 30 that is formed at the glass cover 28 is energized.

When the heater coating film 30 is energized, the heater coating film 30 is made to generate heat due to the electrical resistance of the heater coating film 30 itself. When the temperature of the heater coating film 30 is raised due to the heat generation of the heater coating film 30, the heat of the heater coating film 30 is transmitted to the glass cover 28, and the temperature of the glass cover 28 rises. When the temperature of the glass cover 28 rises in this way, the water droplets or frost that have adhered to the glass cover 28 evaporate, or the fog on the glass cover 28 is removed. Due thereto, the camera 18 can capture a clear image as compared with before removal of the water droplets or frost or the like.

On the other hand, at the time of assembling the present imaging device 10 for a vehicle, for example, the glass cover 28 is fixed by the tape 32 to the device front side end of the camera main body 20 of the camera 18. In this state, the camera main body 20 is inserted into the inner side of the bracket main body 14 from the device rear side of the bracket main body 14. Due thereto, the glass cover 28 and the tape 32 are disposed at the inner side of the bracket main body 14. In this state, the closing member 16 is assembled to the device rear side end of the bracket main body 14, and the device rear side end of the bracket main body 14 is closed by the closing member 16.

Further, in the assembled state of the present imaging device 10 for a vehicle, the tape 32 is pushed against the device rear side surface of the glass cover 28 by the camera main body 20 of the camera 18. Due thereto, when the glass cover 28 is pushed from the device rear side by the tape 32, the heater coating film 30, which is formed on the device front side surface of the glass cover 28, is made to press-contact the positive electrode side press-contact portions 46 of the positive electrode side press-contact pieces 44 of the positive electrode terminal 40 for the heater and the negative electrode side press-contact portions 56 of the negative electrode side press-contact pieces 54 of the negative electrode terminal 42 for the heater. Due thereto, the heater coating film 30, and the positive electrode side press-contact portions 46 and the negative electrode side press-contact portions 56, are made to contact one another, and can be connected electrically. In this way, there is no need for mechanical and electrical wire connecting work of a cable or the like to the heater coating film 30 by soldering or the like, and therefore, in this sense as well, assembly of the present imaging device 10 for a vehicle is easy.

Moreover, the heater coating film 30 is made to press-contact the positive electrode side press-contact portions 46 and the negative electrode side press-contact portions 56. Therefore, the positive electrode side press-contact portions 46 and the negative electrode side press-contact portions 56 moving apart relatively from the heater coating film 30 can be suppressed, and the electrical connection between the positive electrode side press-contact portions 46 and the negative electrode side press-contact portions 56, and the heater coating film 30, being cancelled inadvertently can be suppressed.

Moreover, in this way, when the present imaging device 10 for a vehicle is assembled, when the heater coating film 30 of the glass cover 28 is made to press-contact the positive electrode side press-contact portions 46 and the negative electrode side press-contact portions 56, the positive electrode side press-contact portions 46 and the negative electrode side press-contact portions 56 receive load from the device rear side from the heater coating film 30 of the glass cover 28. The positive electrode side press-contact pieces 44 of the positive electrode terminal 40 for the heater and the negative electrode side press-contact pieces 54 of the negative electrode terminal 42 for the heater can elastically deform with respective thickness direction sides thereof being the centers of the curvature.

Therefore, as described above, when the positive electrode side press-contact portions 46 and the negative electrode side press-contact portions 56 receive the load from the device rear side from the heater coating film 30 of the glass cover 28, the positive electrode side press-contact portions 46 and the negative electrode side press-contact portions 56 are made to press-contact the heater coating film 30 of the glass cover 28 due to the respective elastic forces of the positive electrode side press-contact pieces 44 and the negative electrode side press-contact pieces 54.

Namely, in the state in which the present imaging device 10 for a vehicle is assembled, the glass cover 28 is elastically nipped by the positive electrode side press-contact pieces 44 of the positive electrode terminal 40 for the heater and the negative electrode side press-contact pieces 54 of the negative electrode terminal 42 for the heater, and by the tape 32. Moreover, due to the glass cover 28 being nipped in this way, the press-contacting of the positive electrode side press-contact portions 46 and the negative electrode side press-contact portions 56 with the heater coating film 30 is maintained. Therefore, in the present embodiment, a special structure for holding the glass cover 28 does not have to be provided at the bracket main body 14.

Further, because the heater coating film 30 is transparent, the heater coating film 30 can be provided within the above-described angle of view range. Therefore, water droplets and frost and the like which have adhered within the range of the above-described angle of view on the heater coating film 30, can be removed quickly.

Moreover, in the present embodiment, the positive electrode terminal 40 for the heater and the negative electrode terminal 42 for the heater are provided integrally with the bracket main body 14 by insert molding at the time of molding the bracket main body 14. Therefore, the heater coating film 30 can be made to press-contact the positive electrode side press-contact portions 46 of the positive electrode terminal 40 for the heater and the negative electrode side press-contact portions 56 of the negative electrode terminal 42 for the heater, by moving the glass cover 28 to a predetermined position at the device front side with respect to the bracket main body 14, at the inner side of the bracket main body 14. Moreover, because the positive electrode terminal 40 for the heater and the negative electrode terminal 42 for the heater are provided at the bracket main body 14 by insert molding, work for assembling the positive electrode terminal 40 for the heater and the negative electrode terminal 42 for the heater to the bracket main body 14 is unnecessary.

Moreover, in the present embodiment, the plural positive electrode side press-contact pieces 44 of the positive electrode terminal 40 for the heater are provided at a predetermined interval in the device vertical direction (the arrow UP direction in FIG. 2 and the direction opposite thereto). Due thereto, the load, which is received by the heater coating film 30 at the time when the positive electrode side press-contact pieces 44 are made to press-contact the heater coating film 30 of the glass cover 28, is dispersed in the device vertical direction as compared with a case in which there is one of the positive electrode side press-contact pieces 44. Therefore, a large load being applied locally to the heater coating film 30 from the positive electrode side press-contact pieces 44 can be suppressed. Further, similarly, a large load being applied locally to the heater coating film 30 from the negative electrode side press-contact pieces 54 can be suppressed.

Further, the positive electrode side connector terminal portion 50 and the negative electrode side connector terminal portion 60, and the terminals at the second connector side, are mechanically and electrically connected due to the connector portion 66 of the bracket main body 14 and the above-described second connector being mechanically connected. Due thereto, there is no need for mechanical and electrical wire connecting work by soldering or the like of the heater coating film 30 and cables or the like at the side of the battery and the control device Therefore, in this sense as well, assembly of the present imaging device 10 for a vehicle is easy.

Moreover, the glass cover 28 is a structure that is elastically nipped by the positive electrode side press-contact pieces 44 of the positive electrode terminal 40 for the heater and the negative electrode side press-contact pieces 54 of the negative electrode terminal 42 for the heater, and by the tape 32. Therefore, the camera 18, the tape 32 and the glass cover 28 can easily be removed from the bracket main body 14, merely by detaching the closing member 16 of the bracket 12 from the bracket main body 14. Therefore, replacement of the respective parts and devices that are the camera 18, the tape 32 and the glass cover 28 can be carried out easily.

Second Embodiment

A second embodiment is described next.

Figure 4:
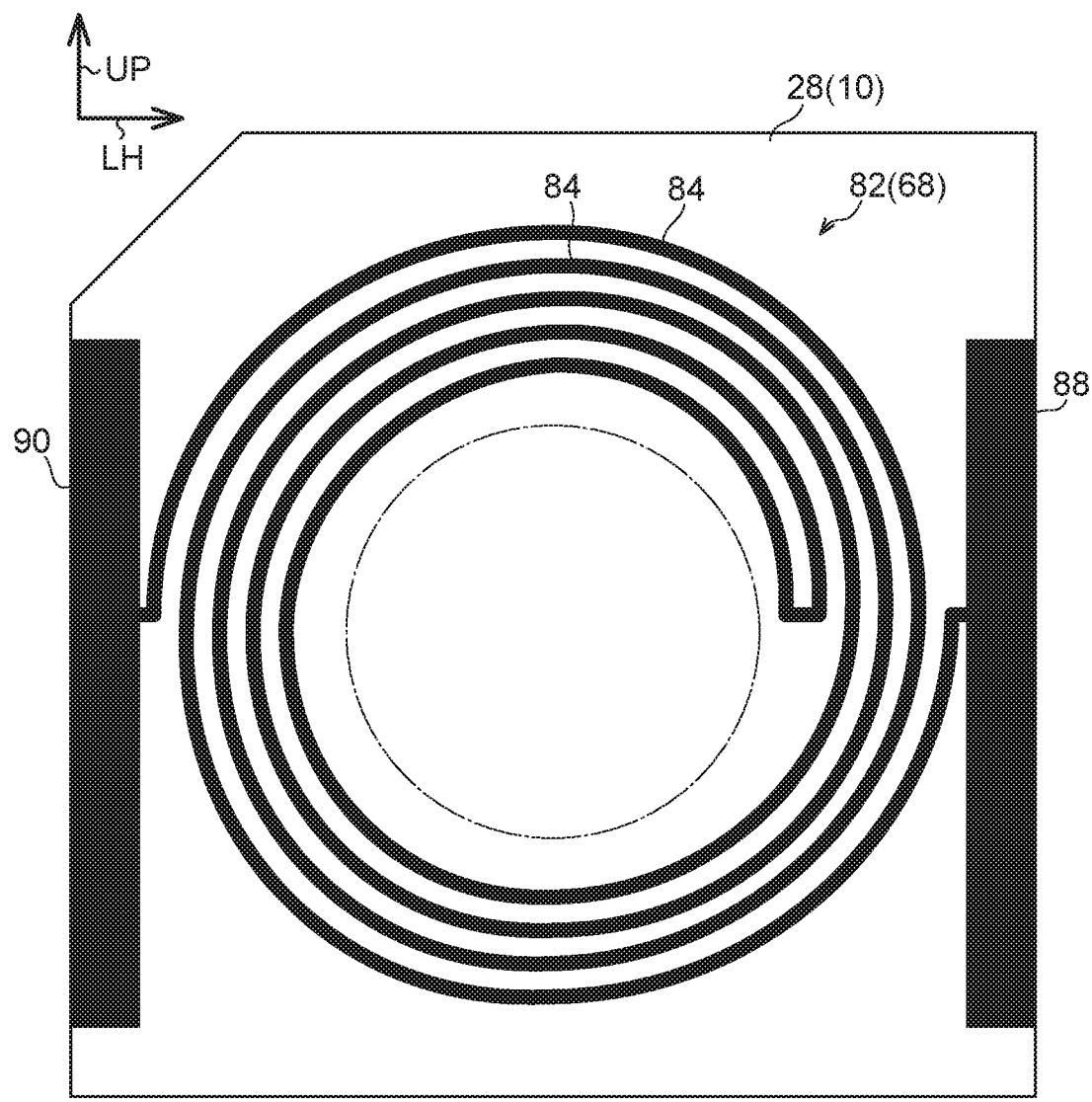
FIG. 4 is a front view seen from the device front side and illustrating a glass cover and a heater wire of an imaging device for a vehicle relating to a second embodiment.

As illustrated in FIG. 4, in the present embodiment, the heater coating film 30 is not provided at the device front side surface of the glass cover 28, and a heater wire 82, which serves as a heater and forms the electrical circuit 68 for the heater, is formed at the device front side surface of the glass cover 28. The heater wire 82 is formed so as to be thin-walled and of a metal or the like that generates heat by being energized. This heater wire 82 is formed by, for example, in a state in which a metal foil that structures the heater wire 82 is spread on the entire device front side surface of the glass cover 28, forming a corrosion-resistant film at the portions that are to become the heater wire 82, and removing portions of the metal film, other than the portions that are to become the heater wire 82, by etching. Note that, other than such a method, for example, methods that are similar to or analogous to methods of forming wires of an electrical circuit at a so-called "printed board" can be used as the method of forming the heater wire 82.

The heater wire 82 has a pair of spiral portions 84. One of the spiral portions 84 is disposed between portions, which are adjacent in the radial direction of the another spiral portion 84, of the another spiral portion 84. The radial direction inner side portions of the spiral portions 84 at these spiral portions 84 are positioned at the outer side of the angle of view that is the range in which the image captured by the camera 18 is projected onto the above-described monitor. Further, the both spiral portions 84 are connected at the respective coiling direction inner side ends thereof, and are electrically connected to one another.

Further, the heater wire 82 has a positive electrode side connection portion 88 and a negative electrode side connection portion 90. The positive electrode side connection portion 88 is formed at the device left side portion at the glass cover 28. The positive electrode side connection portion 88 is connected to the coiling direction outer side end of one of the pair of spiral portions 84, and the positive electrode side connection portion 88 and the one spiral portion 84 are connected electrically. Further, at the positive electrode side connection portion 88, the positive electrode side press-contact portions 46 of the positive electrode side press-contact pieces 44 of the positive electrode terminal 40 for the heater are made to press-contact the positive electrode side connection portion 88.

In contrast, the negative electrode side connection portion 90 is formed at the device right side portion at the glass cover 28. The negative electrode side connection portion 90 is connected to the coiling direction outer side end of the another of the pair of spiral portions 84, and the negative electrode side connection portion 90 and the another spiral portion 84 are connected electrically. Further, at the negative electrode side connection portion 90, the negative electrode side press-contact portions 56 of the negative electrode side press-contact pieces 54 of the negative electrode terminal 42 for the heater are made to press-contact the negative electrode side connection portion 90.

The heater wire 82 that has such a structure structures the electrical circuit 68 for the heater, instead of the heater coating film 30 in the above-described first embodiment.

In this present embodiment, the heater wire 82 is applied instead of the heater coating film 30 in the first embodiment, but basically, operations that are similar to those of the above-described first embodiment are performed, and effects that are similar to those of the above-described first embodiment can be obtained.

Note that, in the present embodiment, the heater wire 82 is a structure having the pair of spiral portions 84. However, structures other than a structure having the spiral portions 84 can be widely used as the heater wire 82, provided that it is a structure that can raise the temperature of the portion of the range of the above-described angle of view at the glass cover 28 by generating heat by being energized.

Further, in the present embodiment, the heater wire 82 is a structure that is formed at the device front side surface of the glass cover 28. However, there may be a structure in which the heater wire 82 is formed at one surface in the thickness direction of a transparent, sheet-shaped member (the surface at the device front side thereof), and this sheet-shaped member is disposed at the device front side of the glass cover 28.

Further, the above-described respective embodiments are structures in which the heater coating film 30 or the heater wire 82 is formed at the device front side surface of the glass cover 28. However, there may be a structure in which the heater coating film 30 or the heater wire 82 is formed at the device rear side surface of the glass cover 28, and the positive electrode side press-contact portions 46 of the positive electrode side press-contact pieces 44 of the positive electrode terminal 40 for the heater and the negative electrode side press-contact portions 56 of the negative electrode side press-contact pieces 54 of the negative electrode terminal 42 for the heater are made to press-contact the heater coating film 30, or the positive electrode side connection portion 88 and the negative electrode side connection portion 90 of the heater wire 82, from the device rear side.

Moreover, in the above-described respective embodiments, there is a structure in which the positive electrode side press-contact portions 46 of the positive electrode side press-contact pieces 44 of the positive electrode terminal 40 for the heater and the negative electrode side press-contact portions 56 of the negative electrode side press-contact pieces 54 of the negative electrode terminal 42 for the heater are made to press-contact the heater coating film 30 or the heater wire 82 from the device front side. However, there may be a structure in which, for example, at least ones of the positive electrode side press-contact portions 46 and the negative electrode side press-contact portions 56 are made to press-contact the heater coating film 30 or the heater wire 82 from the side of a direction orthogonal to the device longitudinal direction.

Further, when forming a structure in which at least ones of the positive electrode side press-contact portions 46 and the negative electrode side press-contact portions 56 are made to press-contact the heater coating film 30 or the heater wire 82 from the side of a direction orthogonal to the device longitudinal direction in this way, at least a portion of the heater coating film 30 or the heater wire 82 may be formed at the outer peripheral surface of the glass cover 28.

Moreover, in the present embodiment, there is a structure in which the positive electrode side press-contact pieces 44 of the positive electrode terminal 40 for the heater and the negative electrode side press-contact pieces 54 of the negative electrode terminal 42 for the heater and the tape 32 are elastic. However, there may be a structure in which only the positive electrode side press-contact pieces 44 and the negative electrode side press-contact pieces 54 are elastic, and the tape 32 is not elastic. Or, there may be a structure in which only the tape 32 is elastic, and the positive electrode side press-contact pieces 44 and the negative electrode side press-contact pieces 54 are not elastic. Further, there may be a structure in which the positive electrode side press-contact pieces 44 and the negative electrode side press-contact pieces 54 are not elastic, and moreover, the tape 32 is not elastic. In this way, in the case of a structure in which the positive electrode side press-contact pieces 44 and the negative electrode side press-contact pieces 54 are not elastic, and moreover, the tape 32 is not elastic, an urging member that urges the glass cover 28 toward the positive electrode side press-contact pieces 44 and the negative electrode side press-contact pieces 54 may be provided separately.

Further, in the present embodiment, there is a structure in which the positive electrode terminal 40 for the heater and the negative electrode terminal 42 for the heater are provided at the bracket main body 14 by insert molding. However, there may be a structure in which the positive electrode terminal 40 for the heater and the negative electrode terminal 42 for the heater, and the bracket main body 14, are structured by separate bodies, and the positive electrode terminal 40 for the heater and the negative electrode terminal 42 for the heater are assembled to the bracket main body 14.

Moreover, there is a structure in which the positive electrode terminal 40 for the heater has the plural positive electrode side press-contact pieces 44 and the negative electrode terminal 42 for the heater has the plural negative electrode side press-contact pieces 54. However, at least one of the positive electrode side press-contact pieces 44 and the negative electrode side press-contact pieces 54 may be structured by a single piece.

Further, in the above-described, respective embodiments, the heater coating film 30 or the heater wire 82 is provided at the glass cover 28. However, for example, the heater may be a structure that is provided at the lens 22 of the camera 18, and there may be a structure in which the water droplets or the like that have adhered to the lens 22 are removed by the heat of the heater. As an example of such a structure, for example, it can be thought to form a structure in which the heater coating film 30 is formed at the device front side surface of the lens 22, a pair of electrically-conductive portions, whose one ends are electrically connected to the heater coating film 30, are provided at the camera main body 20 at the outer side of the above-described angle of view at the lens 22, and another end of one of the pair of electrically-conductive portions is made to press-contact the positive electrode side press-contact portions 46 of the positive electrode side press-contact pieces 44 of the positive electrode terminal 40 for the heater, and another end of of another of the pair of electrically-conductive portions is made to press-contact the negative electrode side press-contact portions 56 of the negative electrode side press-contact pieces 54 of the negative electrode terminal 42 for the heater.

The disclosure of Japanese Patent Application No. 2020-080796 that was filed on Apr. 30, 2020 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference

The invention claimed is:

1. An imaging device for a vehicle, comprising:
   an imaging section configured to capture images of an imaging side;
   a heater, that, by being energized, generates heat and removes moisture that has adhered to the imaging section;
   a bracket, to which the imaging section and the heater are assembled; and
   a terminal configured to energize the heater, the terminal being provided at the bracket and structured as a body separate from the heater, and the terminal being electrically connected to the heater by being contacted to the heater such that the heater is nipped, directly or indirectly, between the terminal and the imaging section due to the imaging section being assembly to the bracket and the heater being assembled to the bracket.

2. The imaging device for a vehicle of claim 1, wherein the imaging section includes a cover member, the cover member being provided at an imaging side of an imaging section main body, at the cover member at least a range of an angle of view of an image captured by the imaging section main body is transparent, and the heater removes moisture that has adhered to the cover member by generating heat.

3. The imaging device for a vehicle of claim 1, wherein the heater is a film that is transparent, is electrically conductive, and is formed at a portion at an imaging side of the imaging section.

4. The imaging device for a vehicle of claim 1, wherein the terminal is configured to press-contact the heater and is electrically connected to the heater due to the heater being assembled to the bracket.

5. The imaging device for a vehicle of claim 1, wherein the terminal is provided integrally with the bracket.

6. The imaging device for a vehicle of claim 5, wherein, at a time of molding the bracket, the terminal is provided at the bracket by insert molding.

7. The imaging device for a vehicle of claim 1, wherein the terminal includes:
   a positive electrode terminal, the positive electrode terminal connecting the heater to a battery installed in a vehicle; and
   a negative electrode terminal, the negative electrode terminal electrically connecting the heater to earth,
   wherein a portion, which is at the heater side, of at least one of the positive electrode terminal and the negative electrode terminal is divided into plural portions, and the respective portions are made to contact the heater.

8. The imaging device for a vehicle of claim 1, wherein the imaging section and the heater are structured as bodies separate from the bracket such that the imaging section and the heater are configured to be assembled to the bracket and to be removed from the bracket.

9. The imaging device for a vehicle of claim 8, further comprising an urging section, wherein the heater and the terminal are press-contacted by an elastic force of the urging section in a state in which the imaging section and the heater are assembled to the bracket.

10. The imaging device for a vehicle of claim 9, wherein the urging section comprises an urging portion that is elastic in an assemble direction in which the imaging section is assembled to the bracket, the urging portion disposed between the imaging section and the terminal in the assemble direction.

11. The imaging device for a vehicle of claim 10, wherein the urging portion urges the heater toward a side of the terminal in the assemble direction due to the elastic force of the urging portion.

12. The imaging device for a vehicle of claim 9, wherein the terminal includes an urging portion that is configured to bendingly deform elastically.

13. The imaging device for a vehicle of claim 12, wherein the terminal including the urging portion urges the heater toward a side opposite the terminal by the elastic force of the urging portion.

14. The imaging device for a vehicle of claim 11, wherein the heater is nipped between the terminal and the imaging section in the assemble direction.

15. The imaging device for a vehicle of claim 13, wherein the heater is nipped between the terminal and the imaging section in an assemble direction in which the imaging section is assembled to the bracket.

16. The imaging device for a vehicle of claim 8, wherein the heater is nipped between the terminal and the imaging section in an assemble direction in which the imaging section is assembled to the bracket.

17. The imaging device for a vehicle of claim 8, further comprising an urging section, wherein:
   the heater and the terminal are press-contacted by an elastic force of the urging section in a state in which the imaging section and the heater are assembled to the bracket;
   the urging section includes a first urging portion that is elastic in an assemble direction in which the imaging section is assembled to the bracket, the first urging portion disposed between the imaging section and the terminal in the assemble direction;
   the first urging portion urging the heater toward a side of the terminal in the assemble direction due to the elastic force of the first urging portion;
   the urging section includes a second urging portion that is a part of the terminal and is configured to bendingly deform elastically;
   the terminal includes the second urging portion urging the heater toward a side opposite the terminal by the elastic force of the second urging portion; and
   the heater is nipped between the terminal and the imaging section in the assemble direction.

18. The imaging device for a vehicle of claim 1, wherein the terminal is electrically connected to the heater by being contacted to the heater such that the heater is nipped directly between the terminal and the imaging section.

19. The imaging device for a vehicle of claim 1, wherein the terminal is electrically connected to the heater by being contacted to the heater such that the heater is nipped indirectly between the terminal and the imaging section.

* * * * *